United States Patent
Auden (10) Patent No.: US 10,053,148 B2
(45) Date of Patent: Aug. 21, 2018

(54) TOE OPTIMIZATION SYSTEM FOR A VEHICLE

(71) Applicant: GM GLOBAL TECHNOLOGY OPERATIONS LLC, Detroit, MI (US)

(72) Inventor: Joshua R. Auden, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 14/739,414

(22) Filed: Jun. 15, 2015

(65) Prior Publication Data
US 2016/0362133 A1 Dec. 15, 2016

(51) Int. Cl.
*A01B 69/00* (2006.01)
*B62D 7/15* (2006.01)
*B62D 6/00* (2006.01)
*B62D 17/00* (2006.01)

(52) U.S. Cl.
CPC .......... *B62D 7/159* (2013.01); *B62D 6/002* (2013.01); *B62D 17/00* (2013.01)

(58) Field of Classification Search
CPC ........ B62D 7/148; B62D 17/00; B62D 6/002; B62D 7/1581; B62D 7/159; B60K 2031/0091
See application file for complete search history.

(56) References Cited

U.S. PATENT DOCUMENTS

| | | | |
|---|---|---|---|
| 4,953,649 A * | 9/1990 | Kawai | B62D 7/148 180/404 |
| 5,014,801 A * | 5/1991 | Hirose | B62D 7/148 180/412 |
| 5,691,900 A | 11/1997 | Luckevich | |
| 2008/0162009 A1 | 7/2008 | Miki et al. | |
| 2011/0313624 A1 | 12/2011 | Yanagi et al. | |
| 2012/0059552 A1* | 3/2012 | Mori | B62D 17/00 701/49 |
| 2012/0220425 A1* | 8/2012 | Field | B60W 10/06 477/110 |
| 2013/0345934 A1* | 12/2013 | Sekiya | B62D 7/148 701/41 |
| 2016/0362133 A1* | 12/2016 | Auden | B62D 17/00 |

FOREIGN PATENT DOCUMENTS

| | | |
|---|---|---|
| CN | 101915673 A | 12/2010 |
| CN | 102666260 A | 9/2012 |

(Continued)

*Primary Examiner* — Redhwan K Mawari
(74) *Attorney, Agent, or Firm* — Quinn IP Law (57) ABSTRACT

A toe optimization system for a vehicle with first and second rear wheels defining a rear toe angle. The vehicle includes a plurality of sensors and first and second actuators operatively connected to the first and second rear wheels, respectively, for varying the rear toe angle. A controller has a processor and tangible, non-transitory memory on which is recorded instructions for executing a method for controlling the rear toe angle. Execution of the instructions by the processor causes the controller to select one of a plurality of vehicle states. Each of the plurality of vehicle states has a respective toe setting. The controller is configured to actuate the first and second actuators to vary the rear toe angle to the respective toe setting. By actively controlling the rear toe angle, the agility and stability of the vehicle can be optimized according to the specific vehicle state.

20 Claims, 2 Drawing Sheets

(56) References Cited

FOREIGN PATENT DOCUMENTS

| | | | | |
|---|---|---|---|---|
| CN | 103118922 A | | 5/2013 | |
| DE | 10253261 | * | 5/2004 | ................ B60T 8/00 |
| DE | 102008048222 A1 | | 4/2010 | |
| DE | 102013110490 A1 | | 3/2015 | |
| JP | 2009255855 A | | 11/2009 | |
| JP | 2010234841 A | | 10/2010 | |
| JP | 2010234869 A | | 10/2010 | |
| JP | 5326019 B2 | | 10/2013 | |

* cited by examiner

TOE OPTIMIZATION SYSTEM FOR A VEHICLE

TECHNICAL FIELD

The disclosure relates generally to an active toe control system, and more particularly, to a vehicle with a toe optimization system.

BACKGROUND

The toe angle of the rear wheels of a vehicle is generally directed by the steering action of the front wheels of the vehicle. The front steering action provides indirect control of the rear toe angle of the vehicle.

SUMMARY

A toe optimization system is provided for a vehicle that has first and second rear wheels defining a (common) rear toe angle. The vehicle includes a plurality of sensors providing respective data. First and second actuators are operatively connected to the first and second rear wheels, respectively, for varying the rear toe angle. A controller is operatively connected to the plurality of sensors and has a processor and tangible, non-transitory memory on which is recorded instructions for executing a method for controlling the rear toe angle. Execution of the instructions by the processor causes the controller to select one of a plurality of vehicle states based on the respective data from at least one of the plurality of sensors. Each of the plurality of vehicle states has a respective toe setting. The controller is configured to actuate the first and second actuators via a toe command to vary the rear toe angle to the respective toe setting selected. By actively controlling the rear toe angle, the agility and stability of the vehicle can be altered and optimized according to the specific driving maneuver or state.

Prior to actuating the first and second actuators via the toe command, the controller is configured to calibrate the respective toe setting corresponding to the selected one of the plurality of vehicle states based at least partially on a speed of the vehicle. The controller may be configured to obtain respective current actuator positions of the first and second actuators via respective actuator position sensors. The controller may be configured to obtain respective current toe positions of the first and second rear wheels via respective toe position sensors. The toe command may be revised based at least partially on the respective current actuator positions and the respective current toe positions.

The plurality of sensors may include a steering angle sensor configured to communicate a steering angle to the controller and a speed sensor configured to communicate a vehicle speed to the controller. A lateral sensor may be configured to communicate a lateral acceleration of the vehicle to the controller. A vehicle roll sensor may be configured to communicate a vehicle roll angle to the controller. A brake pedal position sensor may be configured to communicate a brake pedal travel to the controller.

The first rear wheel may be configured to be in contact with a first contact surface such that a first coefficient of friction is defined between the first rear wheel and the first contact surface. The second rear wheel may be configured to be in contact with a second contact surface such that a second coefficient of friction is defined between the second rear wheel and the second contact surface. Prior to the selection of one of the plurality of vehicle states, the controller may be configured to determine if at least one of the first and second coefficients of friction is at or below a threshold friction value. If at least one of the first and second coefficients of friction is at or below the threshold friction value, the controller may be configured to then actuate the first and second actuators via the toe command to vary the rear toe angle to a predefined opt-out setting.

The plurality of vehicle states may include first through fourteenth vehicle states corresponding to respective first through fourteenth toe settings. A first vehicle state may be characterized by the steering wheel angle being below a first steering angle threshold and the vehicle speed being below a speed threshold. A second vehicle state may be characterized by the steering wheel angle being above the first steering angle threshold and the vehicle speed being above the speed threshold. In one example, the first steering angle threshold is about 5 degrees, clockwise or counter clockwise.

A third vehicle state may be characterized by the steering wheel angle being above the first steering angle threshold and the lateral acceleration of the vehicle being above a threshold lateral acceleration. In one example, the threshold lateral acceleration is 0.1 G. A fourth vehicle state may be characterized by a rate of change of the steering wheel angle being above a threshold angle change (for example 300-400 degrees per second) and the brake pedal travel being above a threshold pedal travel in a threshold time (for example, above 50% of the maximum pedal travel in 0.5 seconds).

A fifth vehicle state may be characterized by the steering wheel angle being zero degrees and the brake pedal being above zero. A sixth vehicle state is characterized by the steering wheel angle being above the steering angle threshold and the brake pedal being above zero.

The plurality of sensors may include first and second rear speed sensors operatively connected to the first and second rear wheels, respectively, and configured to communicate first and second wheel speed changes to the controller. A seventh vehicle state may be characterized by a split condition such that the first wheel speed change is zero and the second wheel change is below a threshold wheel speed change.

An eighth vehicle state may be characterized by a vehicle load above a load threshold. A ninth vehicle state is characterized by a steering angle of above 10 degrees and a lateral acceleration of zero degrees. The plurality of sensors may include a tire temperature sensor configured to communicate a tire temperature to the controller. A tenth vehicle state may be characterized by the tire temperature being at or below 50 degrees Fahrenheit. The plurality of sensors may include a vehicle roll sensor configured to communicate a vehicle roll angle to the controller. An eleventh vehicle state may be characterized by the vehicle roll angle being above a threshold roll angle. If none of the previously defined vehicle states is applicable, the controller may be configured to select a fourteenth vehicle state ("none of the above") is selected.

The above features and advantages and other features and advantages of the present disclosure are readily apparent from the following detailed description of the best modes for carrying out the disclosure when taken in connection with the accompanying drawings.

DETAILED DESCRIPTION

Figure 1:
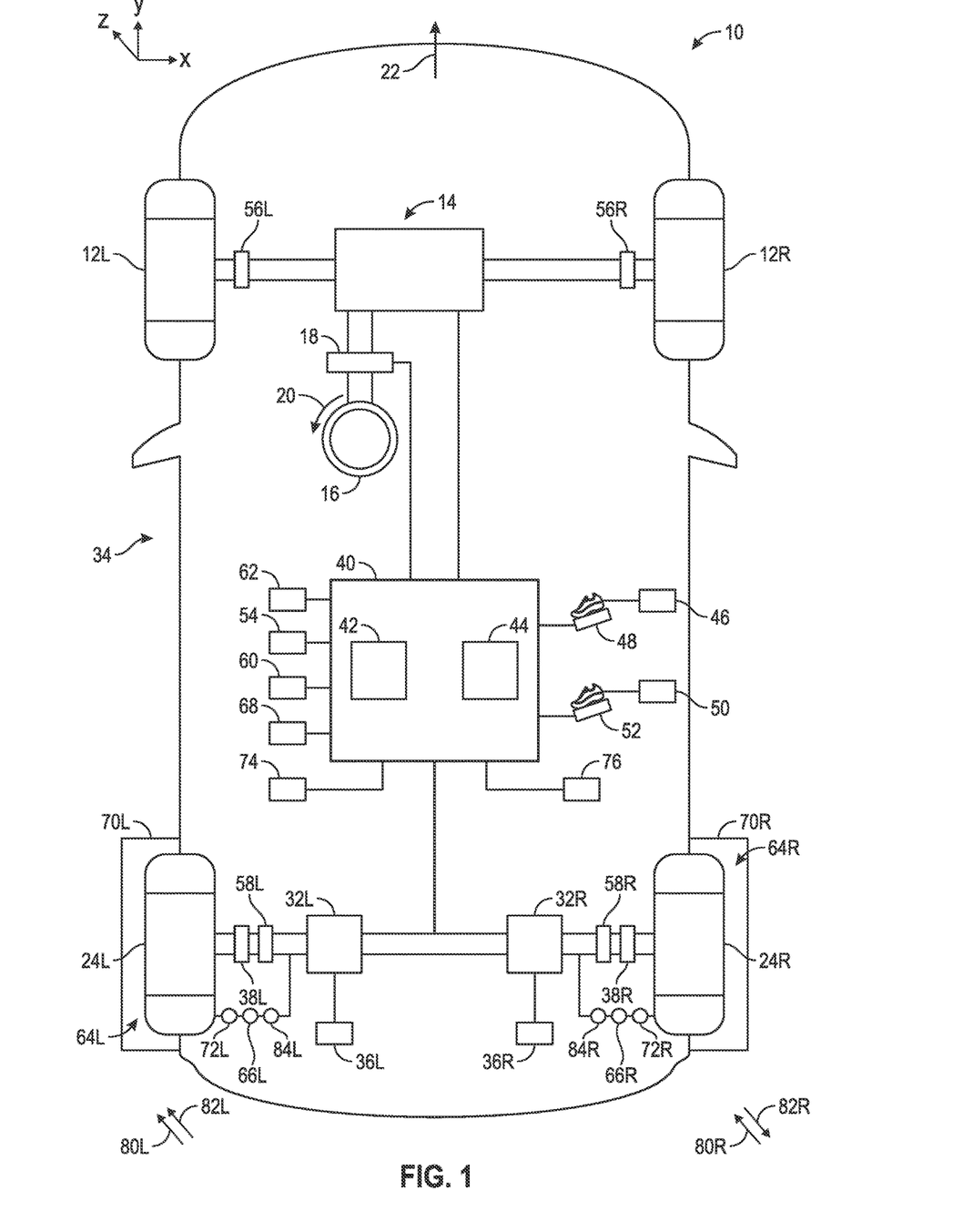
FIG. 1 is a schematic fragmentary view of a vehicle having first and second rear wheels.

Referring to the Figures, wherein like reference numbers refer to the same or similar components throughout the several views, FIG. 1 shows a vehicle 10. The vehicle 10 has first and second front wheels 12L, 12R that are configured to be steered by a steering system 14 with a manually operated steering device, such as steering wheel 16. The vehicle 10 may include a steering angle sensor 18 operatively connected to the steering wheel 16 and configured to detect the steering angle 20 during operation of the vehicle 10. The steering angle 20 may be clockwise or counter clockwise and is defined by the steering wheel 16 relative to the longitudinal axis 22 of the vehicle 10.

Figure 2:
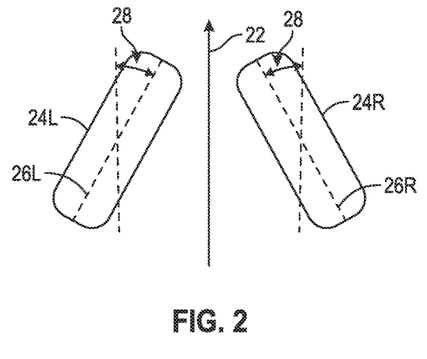
FIG. 2 is a schematic fragmentary view of the first and second rear wheels of FIG. 1 illustrating a toe-in setting.
Figure 3:
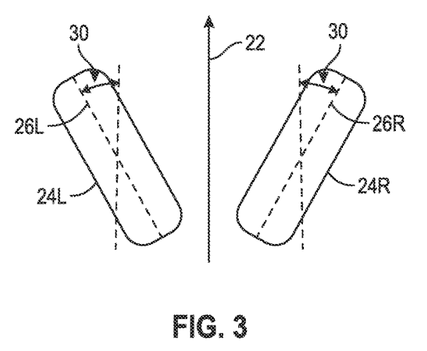
FIG. 3 is a schematic fragmentary view of the first and second rear wheels of FIG. 1 illustrating a toe-out setting.

Referring to FIGS. 1-3, the vehicle 10 includes first and second rear wheels 24L, 24R defining a rear toe angle, referred to herein also as "toe". Referring to FIGS. 2-3, the rear toe angle (shown by reference numbers 28, 30) is the symmetric angle that the respective centerlines 26L, 26R of the first and second rear wheels 24L, 24R make with the longitudinal axis 22 of the vehicle 10, or lines parallel to it. FIG. 2 shows the first and second rear wheels 24L, 24R with a toe-in setting and rear toe angle 28, with the first and second rear wheels 24L, 24R pointing in towards the center of the vehicle 10. FIG. 3 shows the first and second rear wheels 24L, 24R with a toe-out setting and rear toe angle 30, with the first and second rear wheels 24L, 24R pointing away from the center of the vehicle 10.

Referring to FIG. 1, the vehicle 10 may include a first actuator 32L and a second actuator 32R for individually altering the toe angles 28, 30 (see FIGS. 2-3) of the first and second rear wheels 24L, 24R. The first and second actuators 32L, 32R may employ any type of mechanism known to those of ordinary skill in the art. The first and second actuators 32L, 32R may each include a cylinder device (not shown) that linearly actuates a piston (not shown) rod by employing, for example, hydraulic pressure. The piston rod may be biased by a spring (not shown) to be retracted such that the toe angle is set to a zero angle at zero hydraulic pressure.

Referring to FIG. 1, a controller 40 is operatively connected to the first and second actuators 32L, 32R. The controller 40 has a processor 42 and tangible, non-transitory memory 44 on which are recorded instructions for executing a method 100, described below with reference to FIG. 4, for controlling the rear toe angle 28, 30 (see FIGS. 2-3). The controller 40 may be an integral portion of, or a separate module operatively connected to, other control modules of the vehicle 10, such as the engine control module. The vehicle 10 may be any passenger or commercial automobile such as a hybrid electric vehicle, including a plug-in hybrid electric vehicle, an extended range electric vehicle, fuel cell or other vehicles. The vehicle 10 may take many different forms and include multiple and/or alternate components and facilities. While an example vehicle is shown in the Figures, the components illustrated in the Figures are not intended to be limiting. Indeed, additional or alternative components and/or implementations may be used.

Referring to FIG. 1, first and second actuator position sensors 36L, 36R are configured to detect the positions of the first and second actuators 32L, 32R and communicate it to the controller 40. The vehicle 10 may include first and second toe sensors 38L, 38R for individually detecting the toe angles 28, 30 of the first and second rear wheels 24L, 24R.

The vehicle 10 includes a plurality of sensors 34 each operatively connected to the controller 40 and configured to communicate respective data or readings to the controller 40. The sensors 34 include the steering angle sensor 18 configured to communicate the steering angle 20 to the controller and each of the vehicle sensors described herein. A brake pedal position sensor 46 is operatively connected to the brake pedal 48 and configured to communicate a brake pedal travel to the controller 40. An accelerator pedal position sensor 50 is operatively connected to the accelerator pedal 52 and configured to communicate an accelerator pedal travel to the controller 40.

A speed sensor 54 is configured to obtain a speed of the vehicle. The vehicle 10 includes front wheel speed sensors 56L, 56R for detecting rotating speeds of the respective first and second front wheels 12L, 12R and rear wheel speed sensors 58L, 58R for detecting rotating speeds of the respective first and second rear wheels 24L, 24R. Referring to FIG. 1, a lateral sensor 60 may be configured to communicate a lateral acceleration of the vehicle to the controller. A yaw-rate sensor 62 may be configured to detect the angular velocity of the vehicle around its vertical axis, also referred to as the yaw rate, and communicate the detected yaw rate to the controller 40. The rear tires 64L, 64R may include respective tire temperature sensors 66L, 66R configured to detect the temperatures of the rear tires 64L, 64R. A rear suspension height sensor 68 is configured to detect a rear suspension height of the vehicle 10.

Referring to FIG. 1, wherein the first rear wheel 24L is configured to be in contact with a first contact surface 70L, with a first coefficient of friction ($\mu 1$) being defined therebetween. The second rear wheel 24R is configured to be in contact with a second contact surface 70R, with a second coefficient of friction ($\mu 1$) being defined therebetween. As is known, the first or second coefficient of friction ($\mu 1$ or $\mu 2$) is a dimensionless scalar value which describes the ratio of the force of friction between two bodies and the force pressing them together.

Figure 4:
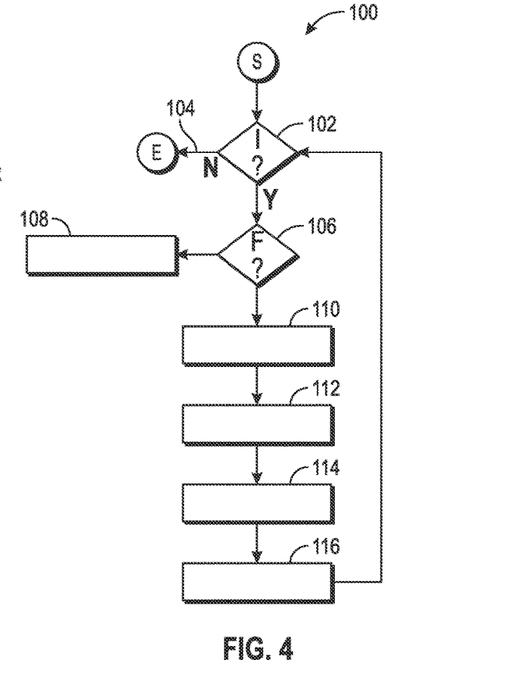
FIG. 4 is a flowchart for a method for controlling a rear toe angle of the vehicle of FIG. 1.

Referring now to FIG. 4, a flowchart of a method 100 stored on and executable by the controller 40 of FIG. 1 is shown. Method 100 is described below with reference to FIGS. 1-5. Method 100 is employed for controlling the rear toe angle 28, 30 shown in FIGS. 2-3. Method 100 need not be applied in the specific order recited herein. In the figure, "Y" and "N" indicate "yes" and "no", respectively. Furthermore, it is to be understood that some steps may be added or steps may be eliminated.

Referring to FIG. 4, method 100 may begin with block 102 where the controller 40 determines if the ignition is on (indicated in FIG. 2 as "I?"). The controller 40 may be initialized when the vehicle 10 is keyed on and may be deactivated when the vehicle 10 is keyed off. If the ignition is not on, the method 100 is exited, as indicated by line 104.

In block 106 of FIG. 4, the controller 40 is configured to determine if at least one of the first and second coefficients of friction ($\mu 1$ or $\mu 2$) is below a threshold friction value. In one example, the threshold friction value is 0.5. The coefficient of friction being at or below the threshold friction value may indicate sand, gravel, rain, snow, ice or other slippery conditions. Any type of method to determine the coefficient of friction may be employed. The vehicle 10 may include first and second friction sensors 72L, 72R operatively connected to the first and second rear wheels 24L, 24R, respectively, to measure the respective first and second coefficients of friction (μ1, μ2). Any type of friction measuring device known to those skilled in the art may be employed. Alternatively, the coefficient of friction may be calculated based on the torque produced by the rotation of the wheel, utilizing data from the first and second rear speed sensors 58L, 58R that are configured to communicate first and second wheel speeds and rate of wheel speed change to the controller 40. In dry or non-slippery road conditions, there is no change in wheel speed and in icy or slippery conditions, the speed of the wheel decreases.

If at least one of the first and second coefficients of friction (μ1, μ2) is below the threshold friction value, the method 100 proceeds to block 108 and the controller 40 is configured to actuate the first and second actuators 32L, 32R via the toe command to vary the rear toe angle 28, 30 to a predefined opt-out setting. In one example, the predefined opt-out setting is a toe-in with a rear toe angle 28 of 0.5 degrees. If the coefficient of friction is above the threshold friction value, the method 100 proceeds to block 110.

In block 110 of FIG. 4, the controller 40 is configured to select one of a plurality of vehicle states based on the respective data from at least one of the plurality of sensors 34. Each of the plurality of vehicle states has a respective toe setting. Any number of vehicle states and respective toe settings may be employed. Examples of fourteen vehicle states are described below and listed in Table 1. It is to be understood that a vehicle 10 need not include each of the vehicle states described below and may include additional vehicle states not described below.

In block 112 of FIG. 4, the controller 40 is configured to calibrate the toe setting corresponding to the vehicle state selected in block 110 with a calibration factor. In one example, the calibration factor is about 0.95 to about 1.05. The calibration factor may be based on the speed of the vehicle 10, as detected by the speed sensor 54. At relatively lower speeds, such as vehicle speeds less than 60 mph, higher toe angles would be used. At higher speeds, such as vehicle speeds above 60 mph, lower toe values may be used. The calibration may involve multiple speed ranges with independently varying toe angles to enable more precise control. For example, the multiple speed ranges may include a first speed range (0-30), a second speed range (31-60), a third speed range (61-90) and a fourth speed range (91-120) with respective first through fourth calibration factors (1.02, 1.01, 0.99, 0.98). The calibration factor may be based on the yaw error rate, as detected by the yaw-rate sensor 62.

In block 114 of FIG. 4, the controller 40 is configured to actuate the first and second actuators 32L, 32R via a toe command to vary the rear toe angle 28, 30 to the selected calibrated toe setting obtained in block 112. The toe command may be based on the toe geometry gain factor. The toe geometry gain factor is the relationship of the desired toe angle to the change in actuator position required to achieve the desired toe angle. For example, a change in angle of 0.1° may require a change in position of the first or second actuators 32L, 32R, of 5 mm. The toe geometry gain factor is specific to each vehicle.

In block 116 of FIG. 4, the controller 40 may be configured to revise the toe command per closed loop feedback regarding actuator position and toe position. The controller 40 may be configured to obtain respective current actuator positions of the first and second actuators 32L, 32R via the respective actuator position sensors 36L, 36R. The controller 40 may be configured to obtain respective current toe positions of the first and second rear wheels via the respective toe position sensors 38L, 38R. The toe command may be revised based at least partially on the respective current actuator positions and the respective current toe positions.

A vehicle 10 may include any number of predefined toe settings corresponding to each of the vehicle states. A specific toe setting may be used for more than one vehicle state. The toe angle of the respective settings may be changed based on the particular vehicle at hand. Any combination of predefined toe settings may be employed.

Referring now to Table 1 below, a first vehicle state may be characterized by (both) the steering angle 20 (detected via steering angle sensor 18) being below a first steering angle threshold and the vehicle speed (detected via speed sensor 54) being below a speed threshold. The first toe setting corresponding to the first vehicle state is a zero rear toe angle 28, 30. Thus, while driving straight ahead at a relatively lower speed, the rear toe is set to zero to minimize rolling resistance, maximize fuel economy, and decrease tire wear. The first steering angle threshold and the speed threshold may be adjusted according to the specific vehicle. In one example, the first steering angle threshold is 5 degrees (clockwise or counter-clockwise) and the speed threshold is 100 miles per hour. In another example, the first steering angle threshold is 7 degrees (clockwise or counter-clockwise) and the speed threshold is about 150 miles per hour.

A second vehicle state may be characterized by the steering angle 20 of FIG. 1 being below the first steering angle threshold and the vehicle speed (detected via speed sensor 54) being above the first speed threshold. The second toe setting corresponding to the second vehicle state may be a toe-in setting with a rear toe angle 28 ranging from 0.1 to 0.3 degrees (inclusive). Thus, while driving straight ahead at a relatively higher speed, the rear toe may be set to toe-in setting to maximize straight line stability.

A third vehicle state may be characterized by the steering angle 20 (detected via steering angle sensor 18) being above the first steering angle threshold and the lateral acceleration (detected via the lateral sensor 60) of the vehicle 10 being above a threshold lateral acceleration. In one example, the threshold lateral acceleration is 0.1 G. The third toe setting corresponding to the third vehicle state may be a toe-out setting with a rear toe angle 30 ranging from 0.1 to 0.3 degrees (inclusive). Thus upon a corner turn-in, the rear toe may be modified for toe-out. Toe-out will increase the agility of the vehicle 10 and help to begin turn rotation.

A fourth vehicle state may be characterized by a rate of change of the steering wheel angle (dS/dt, based on the steering angle sensor 18) being above a threshold angle change (for example 300-400 degrees per second) and the brake pedal travel being above a threshold pedal travel in a threshold time (for example, above 50% of the maximum pedal travel in 0.5 seconds). The fourth toe may be a toe-in setting with a rear toe angle 28 ranging from 0.1 to 0.3 degrees (inclusive), to increase vehicle stability.

A fifth vehicle state may be characterized by the steering wheel angle being zero degrees and the brake pedal being above zero (detected via the brake pedal position sensor 46), i.e., any amount of brake pedal travel. A sixth vehicle state is characterized by the steering wheel angle being above the steering angle threshold and the brake pedal travel being above zero. The fifth and sixth toe settings may each be toe-in settings with a rear toe angle 28 ranging from 0.1 to 0.3 degrees (inclusive). Thus, during straight line braking, the rear toe may be modified to the toe-in setting to increase vehicle stability.

A seventh vehicle state may be characterized by split friction surface condition (referred to as "split-mu braking" in Table 1). As previously noted, the plurality of sensors 34 may include first and second rear speed sensors 58L, 58R operatively connected to the first and second rear wheels 24L, 24R, respectively, and configured to communicate first and second wheel speeds (rotating speeds) and rate of wheel speed change to the controller 40. The seventh vehicle state is characterized by a split condition such that the first rate of wheel speed change is zero and the second rate of wheel change is below a threshold wheel speed change. The seventh toe setting corresponding to the seventh vehicle state may be a toe-in setting with a rear toe angle 28 ranging from 0.1 to 0.3 degrees (inclusive).

An eighth vehicle state may be characterized by a vehicle load above a load threshold and the eighth toe setting is the default toe setting The vehicle load may be indicated by the rear suspension height sensor 68 of FIG. 1. The geometry in the vehicle 10 will make the toe go towards a toe-in setting when the ride height of the vehicle decreases (lowers relative to the ground plane) because of an additional load and vice versa when the load is decreased. The eighth toe setting corresponding to the eighth vehicle state is a correction to achieve a default toe setting. In other words, the controller 40 is configured to compensate for the normal geometric change by keeping the rear toe angle 28, 30 at the same nominal or default value, regardless of ride height (or load).

The default toe setting may be a zero toe angle, a toe-in of 0.1 degrees, a toe-out of 0.1 degrees, a toe-in of 0.2 degrees, a toe-out of 0.5 degrees or any other value. Any combination and degrees of angles may be employed. For example, a vehicle 10 may have a default toe setting of toe-in at 0.1 degree. When that vehicle 10 is loaded with 300 lbs in the trunk, this may cause in a toe-in setting of 2 degrees. The controller 40 would compensate for that load and set the rear toe back to the default toe-in setting of 0.1 degrees.

A ninth vehicle state (indicated as "cross winds or road crown" in Table 1) may be characterized by the steering angle 20 being above a second steering angle threshold (S2) and the lateral acceleration (detected via the lateral sensor 60) of the vehicle being at zero degrees. The second threshold steering angle (S2) may be double the first threshold steering angle (S1). In one example, the second threshold steering angle (S2) is 10 degrees. The ninth toe setting corresponding to the ninth vehicle state may be the default toe setting, for offsetting the cross-wind or road crown.

Referring to FIG. 1, the vehicle 10 may include a wind-measuring instrument 76 to detect the wind strength of cross-winds impacting the vehicle 10 at a 90 degree angle. Any wind-measuring instrument 76, known to those skilled in the art may be used. In this case, the ninth vehicle state may be characterized by the steering angle 20 being above a second steering angle threshold (S2), the lateral acceleration of the vehicle 10 being at zero degrees and the reading of the anenometer 76 being above a threshold value.

A tenth vehicle state (referred to as "cold tires" in Table 1) may be characterized by a tire temperature sensor reading (via sensors 66L, 66R shown in FIG. 1) of below about 50 degrees Fahrenheit. The tenth toe setting corresponding to the tenth vehicle state may be a toe-in setting with the rear toe angle 28 at or above 5 degrees. The relatively large rear toe angle 28 allows heat to be generated by the scrubbing of the vehicle tires 64L, 64R (shown in FIG. 1).

An eleventh state may be characterized by the roll position of the vehicle 10, as indicated by the roll sensor 74, being above a threshold roll position. Referring to FIG. 2, a twelfth vehicle state may be characterized by an in-phase ride input such that respective first vertical displacements 80L, 80R of the first and second rear wheels 24L, 24R (in a direction parallel to a vertical axis z) is in the same direction. An example of an in-phase ride input would be a speed bump. A thirteenth vehicle state may be characterized by an out-of-phase ride input such that the respective second vertical displacements 82L, 82R of the first and second rear wheels 24L, 24R (in a direction parallel to to a vertical axis z) are in opposite directions. An example of an out-of-phase ride input would be a pothole. The first and second vertical displacements 80L/R and 82L/R may be indicated by first and second tire position sensors 84L, 84R, respectively, shown in FIG. 1.

Figure 5:
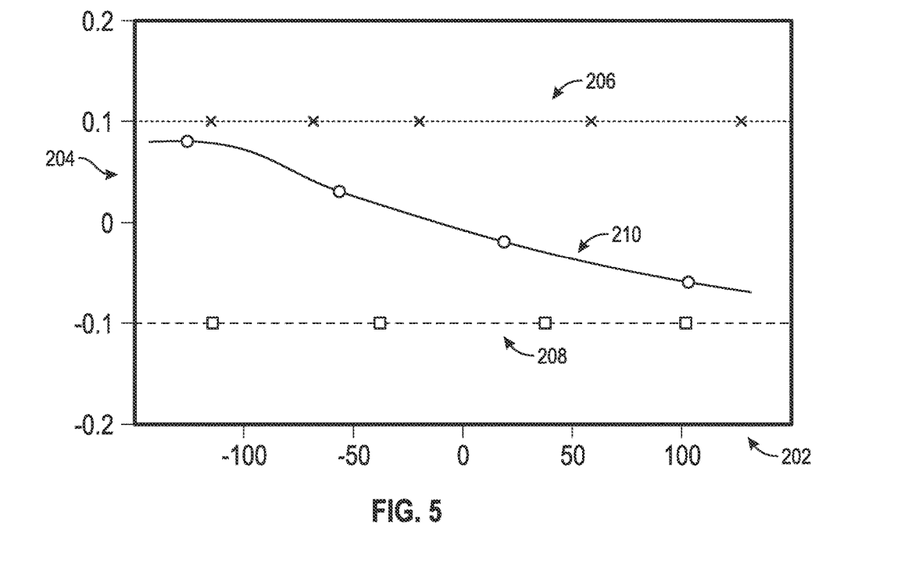
FIG. 5 shows examples of optimized toe curves that may be employed in the method of FIG. 4.

The tenth, eleventh and twelfth toe settings may be each adjusted based on an optimized toe curve. FIG. 5 shows some examples of optimized toe curves that may be employed. Axis 202 indicates vertical displacement in millimeters, with positive units indicating jounce and negative units indicating rebound. Axis 204 indicates rear toe angles. The optimized curve is a flat line in traces 206 and 208. Trace 210 shows a non-flat optimized curve. In the eleventh, twelfth, thirteenth and fourteenth states, speed bumps or potholes or something else causes a change in the toe setting, which could be varying degrees of toe-in and toe-out. In one example, a vehicle 10 may have a flat optimized curve with a toe-in setting at 0.2 degree. When that vehicle 10 goes over a speed bump, it may result in a toe-out setting of 2 degrees. Adjusting to an optimized toe curve means that the method 100 will compensate for that change in toe setting and set the rear toe back to the optimized setting of toe-in at 0.2 degree.

If none of the previously defined vehicle states is applicable, the "none of the above" vehicle state (shown as the fourteenth state in Table 1) is selected. The toe setting corresponding to the "none of the above" vehicle state may be the default toe state predefined for the vehicle 10.

As noted above, the controller 40 of FIG. 1 may include a computing device that employs an operating system or processor 42 and memory 44 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 42 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

TABLE 1

| Vehicle State | Rear Toe Setting |
| --- | --- |
| 1. Straight, relatively lower speed driving | Toe set to 0 |
| 2. Straight, relatively higher speed driving | Toe-in setting |
| 3. Corner turn-in | Toe-out setting |
| 4. Rapid changes | Toe-in setting |
| 5. Straight line braking | Toe-in setting |
| 6. Braking in a turn | Toe-in setting |
| 7. Split-mu braking | Toe-in setting (counter-yaw direction) |
| 8. Heavily loaded vehicle | Correct toe to the default toe setting |
| 9. Cross winds or road crown | Correct toe to the default toe setting |
| 10. Cold tires | Toe-in setting |
| 11. Vehicle roll | Toe adjusted to optimized toe curve |
| 12. In-phase ride inputs | Toe adjusted to optimized toe curve |
| 13. Out-of-phase ride inputs | Toe adjusted to optimized toe curve |
| 14. None of the above | Default toe setting |

The invention claimed is:

1. A toe optimization system for a vehicle having first and second rear wheels defining a rear toe angle and a plurality of sensors providing respective data, the system comprising:
   first and second actuators operatively connected to the first and second rear wheels, respectively, and configured to vary the rear toe angle;
   a controller operatively connected to the plurality of sensors and having a processor and tangible, non-transitory memory on which is recorded instructions for executing a method for controlling the rear toe angle;
   wherein the first rear wheel is configured to be in contact with a first contact surface such that a first coefficient of friction is defined between the first rear wheel and the first contact surface;
   wherein the second rear wheel is configured to be in contact with a second contact surface such that a second coefficient of friction is defined between the second rear wheel and the second contact surface; and
   wherein execution of the instructions by the processor causes the controller to:
      select one of a plurality of vehicle states based on the respective data from at least one of the plurality of sensors, each one of the plurality of vehicle states having a respective toe setting; and
      actuate the first and second actuators via a toe command to vary the rear toe angle to the respective toe setting corresponding to the selected one of the plurality of vehicle states;
   wherein prior to the selection of one of the plurality of vehicle states, the controller is configured to:
      determine if at least one of the first and second coefficients of friction is at or below a threshold friction value; and
      if at least one of the first and second coefficients of friction is at or below the threshold friction value, then actuate the first and second actuators via the toe command to vary the rear toe angle to a predefined opt-out setting.

2. The system of claim 1, wherein prior to actuating the first and second actuators via the toe command, the controller is configured to:
   calibrate the respective toe setting corresponding to the selected one of the plurality of vehicle states based at least partially on a speed of the vehicle.

3. The system of claim 1, wherein after actuating the first and second actuators, the controller is further configured to:
   obtain respective current actuator positions of the first and second actuators via respective actuator position sensors;
   obtain respective current toe positions of the first and second rear wheels via respective toe position sensors; and
   revise the toe command based at least partially on the respective current actuator positions and the respective current toe positions.

4. A vehicle comprising:
   first and second rear wheels defining a rear toe angle;
   first and second actuators operatively connected to the first and second rear wheels, respectively, and configured to vary the rear toe angle;
   a controller operatively connected to the first and second actuators and having a processor and tangible, non-transitory memory on which is recorded instructions for executing a method for controlling the rear toe angle;
   a plurality of sensors operatively connected to and configured to communicate respective data to the controller, the plurality of sensors including a steering angle sensor configured to communicate a steering angle to the controller;

wherein the first rear wheel is configured to be in contact with a first contact surface such that a first coefficient of friction is defined between the first rear wheel and the first contact surface;

wherein the second rear wheel is configured to be in contact with a second contact surface such that a second coefficient of friction is defined between the second rear wheel and the second contact surface;

wherein execution of the instructions by the processor causes the controller to:

select one of a plurality of vehicle states based on the respective data from at least one of the plurality of sensors, each one of the plurality of vehicle states having a respective toe setting; and actuate the first and second actuators via a toe command to vary the rear toe angle to the respective toe setting corresponding to the selected one of the plurality of vehicle states;

wherein prior to the selection of one of the plurality of vehicle states, the controller is configured to:

determine if at least one of the first and second coefficients of friction is at or below a threshold friction value; and if at least one of the first and second coefficients of friction is at or below the threshold friction value, then actuate the first and second actuators via the toe command to vary the rear toe angle to a predefined opt-out setting.

5. The vehicle of claim 4, wherein prior to actuating the first and second actuators, the controller is configured to:

calibrate the respective toe setting corresponding to the selected one of the plurality of vehicle states based at least partially on a speed of the vehicle.

6. The vehicle of claim 4, wherein after actuating the first and second actuators, the controller is further configured to:

obtain respective current actuator positions of the first and second actuators via respective actuator position sensors;

obtain respective current toe positions of the first and second rear wheels via respective toe position sensors; and revise the toe command based at least partially on the respective current actuator positions and the respective current toe positions.

7. The vehicle of claim 4, wherein:

the plurality of sensors include a speed sensor configured to communicate a vehicle speed to the controller; and the plurality of vehicle states includes a first vehicle state characterized by the steering angle being below a first steering angle threshold and the vehicle speed being below a speed threshold.

8. The vehicle of claim 4, wherein:

the plurality of sensors include a speed sensor configured to communicate a vehicle speed to the controller; and the plurality of vehicle states includes a second vehicle state characterized by the steering angle being at or above the first steering angle threshold and the vehicle speed being above the speed threshold.

9. The vehicle of claim 4, wherein:

the plurality of sensors include a lateral sensor configured to communicate a lateral acceleration of the vehicle to the controller; and the plurality of vehicle states includes a third vehicle state characterized by the steering angle being above the first steering angle threshold and the lateral acceleration being above a threshold lateral acceleration.

10. The vehicle of claim 4, wherein:

the plurality of sensors include a brake pedal position sensor configured to communicate a brake pedal travel to the controller;

the plurality of vehicle states includes a fourth vehicle state characterized by a rate of change of the steering angle being above a threshold angle change and the brake pedal travel being above a threshold pedal travel in a threshold time.

11. The vehicle of claim 4, wherein:

the plurality of sensors include a brake pedal position sensor configured to communicate a brake pedal travel to the controller;

the plurality of vehicle states includes a fifth vehicle state characterized by the steering wheel angle being zero degrees and the brake pedal being above zero; and the plurality of vehicle states includes a sixth vehicle state characterized by the steering wheel angle being above the first steering angle threshold and the brake pedal travel being above zero.

12. The vehicle of claim 4, wherein:

the plurality of sensors include first and second rear speed sensors operatively connected to the first and second rear wheels, respectively, and configured to communicate first and second wheel speed changes to the controller; and the plurality of vehicle states includes a seventh vehicle state characterized by a split condition such that the first wheel speed change is zero and the second wheel change is below a threshold wheel speed change.

13. The vehicle of claim 4, wherein:

the plurality of vehicle states includes an eighth vehicle state characterized by a vehicle load above a load threshold;

the plurality of sensors include a lateral sensor configured to communicate a lateral acceleration of the vehicle to the controller; and the plurality of vehicle states includes a ninth vehicle state characterized by the steering angle being above a second steering angle threshold and the lateral acceleration being zero degrees.

14. The vehicle of claim 4, wherein:

the plurality of sensors include a tire temperature sensor configured to communicate a tire temperature to the controller; and the plurality of vehicle states includes a tenth vehicle state characterized by the tire temperature being at or below 40 degrees Fahrenheit.

15. The vehicle of claim 4, wherein:

the plurality of sensors include a vehicle roll sensor configured to communicate a vehicle roll angle to the controller; and the plurality of vehicle states includes an eleventh vehicle state characterized by the vehicle roll angle being above a threshold roll angle.

16. The vehicle of claim 4, wherein:

the plurality of sensors include respective tire position sensors configured to communicate respective vertical displacements of the first and second rear wheels to the controller;

the plurality of vehicle states includes twelfth and thirteenth vehicle states corresponding to twelfth and thirteenth toe settings, respectively;

the twelfth vehicle state is characterized by the respective vertical displacements of the first and second rear wheels being uni-directional;

the thirteenth vehicle state is characterized by the respective vertical displacements of the first and second rear wheels being in opposite directions; and the twelfth and thirteenth toe settings are each based on an optimized toe curve.

17. The vehicle of claim 4, wherein:

the plurality of sensors include a speed sensor configured to communicate a vehicle speed to the controller, the plurality of vehicle states including a first vehicle state characterized by the steering angle being below a first steering angle threshold and the vehicle speed being below a speed threshold;

the plurality of vehicle states includes a second vehicle state characterized by the steering angle being at or above the first steering angle threshold and the vehicle speed being above the speed threshold;

the plurality of sensors include a lateral sensor configured to communicate a lateral acceleration of the vehicle to the controller; and the plurality of vehicle states includes a third vehicle state characterized by the steering angle being above the first steering angle threshold and the lateral acceleration being above a threshold lateral acceleration.

18. The vehicle of claim 17, wherein:

the plurality of sensors include a brake pedal position sensor configured to communicate a brake pedal travel to the controller, the plurality of vehicle states including a fourth vehicle state characterized by a rate of change of the steering angle being above a threshold angle change and the brake pedal travel being above a threshold pedal travel in a threshold time;

the plurality of vehicle states includes a fifth vehicle state characterized by the steering wheel angle being zero degrees and the brake pedal being above zero; and the plurality of vehicle states includes a sixth vehicle state characterized by the steering wheel angle being above the first steering angle threshold and the brake pedal travel being above zero.

19. The vehicle of claim 18, wherein:

the plurality of sensors include first and second rear speed sensors operatively connected to the first and second rear wheels, respectively, and configured to communicate first and second wheel speed changes to the controller;

the plurality of vehicle states includes a seventh vehicle state characterized by a split condition such that the first wheel speed change is zero and the second wheel change is below a threshold wheel speed change;

the plurality of vehicle states includes an eighth vehicle state characterized by a vehicle load above a load threshold; and the plurality of vehicle states includes a ninth vehicle state characterized by the steering angle being above a second steering angle threshold and the lateral acceleration being zero degrees.

20. The vehicle of claim 19, wherein:

the plurality of sensors include a tire temperature sensor configured to communicate a tire temperature to the controller;

the plurality of vehicle states includes a tenth vehicle state characterized by the tire temperature being at or below 40 degrees Fahrenheit;

the plurality of sensors include a vehicle roll sensor configured to communicate a vehicle roll angle to the controller;

the plurality of vehicle states includes an eleventh vehicle state characterized by the vehicle roll angle being above a threshold roll angle;

the plurality of sensors include respective tire position sensors configured to communicate respective vertical displacements of the first and second rear wheels to the controller;

the plurality of vehicle states includes twelfth and thirteenth vehicle states corresponding to twelfth and thirteenth toe settings, respectively;

the twelfth vehicle state is characterized by the respective vertical displacements of the first and second rear wheels being uni-directional;

the thirteenth vehicle state is characterized by the respective vertical displacements of the first and second rear wheels being in opposite directions; and the twelfth and thirteenth toe settings are each based on an optimized toe curve.

* * * * *